(12) United States Patent
Hambloch et al.

(10) Patent No.: US 12,145,662 B2
(45) Date of Patent: Nov. 19, 2024

(54) METHOD FOR OPERATING AN ELECTROMECHANICALLY ASSISTED STEERING SYSTEM

(71) Applicant: ZF Automotive Germany GmbH, Alfdorf (DE)

(72) Inventors: Peter Hambloch, Krefeld (DE); Philipp Bergmann, Duesseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 258 days.

(21) Appl. No.: 17/957,626

(22) Filed: Sep. 30, 2022

(65) Prior Publication Data
US 2023/0109469 A1  Apr. 6, 2023

(30) Foreign Application Priority Data
Oct. 1, 2021 (DE) .......................... 102021211073.8

(51) Int. Cl.
*B62D 5/00* (2006.01)
*B62D 6/00* (2006.01)

(52) U.S. Cl.
CPC .............. *B62D 5/006* (2013.01); *B62D 6/008* (2013.01)

(58) Field of Classification Search
CPC ................................ B62D 5/006; B62D 6/008
See application file for complete search history.

(56) References Cited

U.S. PATENT DOCUMENTS

| | | | |
|---|---|---|---|
| 2007/0289806 A1* | 12/2007 | Matsuda | B62D 6/10 180/444 |
| 2012/0175183 A1* | 7/2012 | Sakaguchi | B62D 5/0472 180/446 |
| 2016/0304119 A1* | 10/2016 | Sugawara | H02P 21/05 |
| 2018/0154936 A1* | 6/2018 | Yamasaki | B62D 15/0285 |
| 2018/0170422 A1* | 6/2018 | Yoshida | B62D 5/0472 |
| 2018/0201306 A1* | 7/2018 | Tsubaki | B62D 1/286 |
| 2019/0263446 A1* | 8/2019 | Tsubaki | B62D 6/00 |
| 2019/0337556 A1* | 11/2019 | Tsubaki | B62D 6/007 |

(Continued)

FOREIGN PATENT DOCUMENTS

| | | |
|---|---|---|
| DE | 102014211815 A1 | 12/2015 |
| DE | 102018215555 A1 | 3/2020 |

*Primary Examiner* — Long T Tran
(74) *Attorney, Agent, or Firm* — Kristin L. Murphy

(57) ABSTRACT

A method for operating an electromechanically assisted steering system of a motor vehicle is described. The steering system has a steering arrangement and at least one electromechanical actuator. The at least one electromechanical actuator is coupled to the steering arrangement in a torque-transmitting manner. The method comprises the following steps:

acquiring a steering rack force signal that comprises information about a steering rack force acting on a steering rack of the steering system;

acquiring a driver torque signal that comprises information about a driver torque exerted on the steering arrangement by the driver;

ascertaining a filtered scaled steering rack force signal; and ascertaining a steering feedback torque for the at least one electromechanical actuator, based on the scaled steering rack force signal.

A control device for an electromechanically assisted steering system of a motor vehicle, an electromechanically assisted steering system, and a computer program are also described.

16 Claims, 2 Drawing Sheets

(56) References Cited

U.S. PATENT DOCUMENTS

2020/0039576 A1\* 2/2020 Shoji .................... B62D 15/025
2021/0031827 A1\* 2/2021 Karve .................. B62D 5/0472
2021/0206124 A1\* 7/2021 Boyle .................. B29C 70/384

\* cited by examiner

METHOD FOR OPERATING AN ELECTROMECHANICALLY ASSISTED STEERING SYSTEM

CROSS-REFERENCE TO RELATED APPLICATION

This application claims priority to German Patent Application No. 102021211073.8, filed Oct. 1, 2021, the disclosure of which is incorporated herein by reference in its entirety.

TECHNICAL FIELD

The disclosure relates to a method for operating an electromechanically assisted steering system of a motor vehicle. The disclosure furthermore relates to a control device for an electromechanically assisted steering system of a motor vehicle, to an electromechanically assisted steering system, and to a computer program.

BACKGROUND

In electromechanically assisted steering systems for motor vehicles, the torque able to be perceived on a steering arrangement, for example on a steering wheel or on a joystick, by the driver is able to be set in full or in part via an electromechanical actuator that is coupled to the steering arrangement.

The electromechanical actuator is usually an electric motor that, depending on the design of the steering system, may also be coupled to the drive wheels of the motor vehicle.

In EPS steering systems, there is usually a mechanical operative connection between the drive wheels of the motor vehicle and the steering arrangement. In this case, however, the steering sensation may be changed via the electromechanical actuator by changing the torque, that is to say a steering feedback torque, able to be perceived on the steering arrangement by the driver.

In steer-by-wire steering systems, there is no mechanical operative connection between the wheels of the motor vehicle and the steering arrangement. The steering arrangement is in this case assigned its own electromechanical actuator that generates the steering feedback torque. In this case, essentially all of the torque able to be perceived on the steering arrangement by the driver is thus generated by the electromechanical actuator.

One particular challenge here is that of setting the steering feedback torque in all driving situations such that it is pleasant for the driver, on the one hand, and that information about the surroundings, for example about the condition of the road, and about the motor vehicle, for example a response of the motor vehicle to a steering movement, is conveyed, on the other hand.

SUMMARY

What is needed is to provide a method for operating an electromechanically assisted steering system that allows improved setting of the steering feedback torque.

A method for operating an electromechanically assisted steering system of a motor vehicle is disclosed herein. The steering system has a steering arrangement and at least one electromechanical actuator, wherein the at least one electromechanical actuator is coupled to the steering arrangement in a torque-transmitting manner. The method comprises the following steps:

acquiring a steering rack force signal that comprises information about a steering rack force acting on a steering rack of the steering system;

acquiring a driver torque signal that comprises information about a driver torque exerted on the steering arrangement by the driver;

ascertaining a filtered scaled steering rack force signal, wherein the acquired steering rack force signal is filtered by way of a filter designed as a high-pass filter or bandpass filter and in one exemplary arrangement, the resultant filtered steering rack force signal is scaled on the basis of the acquired driver torque signal in order to ascertain the filtered scaled steering rack force signal, or wherein the acquired steering rack force signal is scaled on the basis of the acquired driver torque signal and the resultant scaled steering rack force signal is filtered by way of a filter designed as a high-pass filter or bandpass filter in order to ascertain the filtered scaled steering rack force signal; and ascertaining a steering feedback torque for the at least one electromechanical actuator based on the filtered scaled steering rack force signal.

Here and in the following text, "acquiring a steering rack force signal" should be understood to mean that the steering rack force signal is measured directly and/or determined from other measured variables, that is to say is, calculated.

The steering rack force signal may therefore be measured directly by way of a suitable sensor of the steering system. As an alternative or in addition, other variables, for example a motor position of an electric motor, an assistive torque of the electric motor, a steering column torque, a steering angle and/or a steering rack position, may be ascertained by way of suitable sensors of the steering system, and the steering rack force signal is ascertained from one or more of these variables.

By way of example, the steering rack force signal may be ascertained based on a mathematical model, wherein the mathematical model describes a lower part of the steering system that comprises the steering rack. The mathematical model may be based on a physical equivalent model of the motor vehicle or of the lower part of the steering system.

Based on a measured variable or multiple measured variables that is or are ascertained by way of one or more sensors of the motor vehicle, it is possible to calculate the steering rack force signal based on the mathematical model.

An observer that is able to ascertain unknown variables of the mathematical model based on available measured variables may be developed based on the mathematical model. The observer may thus be used to determine unknown variables based on the at least one measured variable, which is able to be measured using sensors that are already installed in the steering system.

It is also conceivable for unknown variables of the mathematical model to be ascertained based on available measured variables by way of a Kalman filter. The Kalman filter works out the unknown variables based on the at least one measured variable, which is able to be measured using sensors that are already installed in the steering system. This saves on costs for the additional measuring sensor system that is otherwise necessary.

The same applies to the term "acquiring a driver torque signal", which should be understood to mean that the driver torque signal is measured directly and/or is determined from other measured variables, that is to say, is calculated.

By way of example, the driver torque signal may be measured directly by way of a torque sensor or what is known as a "torque-and-angle sensor" (TAS sensor), which is able to ascertain both an angle of rotation of the steering arrangement and a torque acting on the steering arrangement.

As an alternative or in addition, other variables, for example a motor position of an electric motor, a steering column torque, a steering angle and/or a steering rack position, may be ascertained by way of suitable sensors of the steering system, and the driver torque signal is ascertained from one or more of these variables.

The term "scaling" should furthermore be understood to mean that the corresponding signals are multiplied by one another.

The filtered scaled steering rack force signal thus corresponds to a multiplication of the filtered steering rack force signal by a further signal that is based at least on the acquired driver torque signal.

The method according to the disclosure is based on the basic idea of using not only the steering rack force signal or the driver torque signal to ascertain the steering feedback torque, but rather a combination of both signals.

It has been found that the steering feedback torque is able to be set very precisely in a desirable manner when the filtered steering rack force signal is scaled with the acquired driver torque signal to ascertain the steering feedback torque.

The method according to the disclosure furthermore makes it possible to ascertain the steering feedback torque within a very short time interval, that is to say the method according to the disclosure has an improved processing speed, since it is possible to use even exclusively internal variables or measured variables of the steering system to ascertain the steering feedback torque.

The method according to the disclosure makes it possible to give very precise feedback to the driver about the surroundings of the motor vehicle, for example about a condition of the road, and about the motor vehicle itself, for example, about a response of the motor vehicle to a steering movement.

Dynamic components of the filtered steering rack force signal may furthermore be set in a manner suitable for the driving dynamics behavior of a front axle of a motor vehicle by scaling based on the driver torque signal.

The high-pass filter or the bandpass filter is configured to filter out, that is to say to remove, a selected frequency range of the steering rack force signal.

The selected frequency range is for example a frequency range that lies below a resonant frequency of the steering system, for example of a steering gear. The high-pass filter or the bandpass filter accordingly has a passband above the resonant frequency.

The resonant frequency is for example in a range between 10 Hz and 20 Hz.

The steering arrangement may be for example a steering wheel or a joystick.

The steering feedback torque for the at least one electromechanical actuator may be ascertained in subsequent steering sensation functions (for example basic steering torque, active reset, damping, etc.).

According to one aspect of the disclosure, a speed signal is acquired, this comprising information about a speed of the motor vehicle, wherein the steering feedback torque is additionally ascertained on the basis of the speed signal. The steering feedback torque is thus ascertained at least on the basis of the speed signal and of the filtered scaled steering rack force signal. In other words, the steering feedback torque may be adapted to the speed of the motor vehicle, such that appropriate feedback that is pleasant for the driver about the surroundings of the motor vehicle, for example about a condition of the road, and about the motor vehicle itself, for example about a response of the motor vehicle to a steering movement, is given at any speed of the motor vehicle. The steering feedback torque that is actually provided thus depends on the speed of the motor vehicle, which is why it may also be said to be speed-dependent.

By way of example, the magnitude of the scaling of the steering feedback torque with the speed signal becomes lower as speed increases. The amplitude of the high-frequency components of the steering rack force signal increases as speed increases, meaning that speed-dependent scaling of the steering rack force signal is able to be used to set the feedback to the driver about the roadway condition as necessary.

In one exemplary arrangement of the disclosure, the speed signal is overlaid with the driver torque signal in order to ascertain a speed-dependent driver torque signal, for example wherein the filtered steering rack force signal and/or the acquired steering rack force signal is scaled with the speed-dependent driver torque signal in order to obtain the filtered scaled steering rack force signal. In other words, the speed signal and the driver torque signal are thus first combined with one another, and in one exemplary arrangement, multiplied by one another. The resultant speed-dependent driver torque signal contains information about the driver torque exerted on the steering arrangement by the driver and information about the speed of the motor vehicle.

The filtered steering rack force signal is thus scaled on the basis of the driver torque and of the speed of the motor vehicle. As an alternative or in addition, the acquired steering rack force signal may be scaled on the basis of the driver torque and of the speed of the motor vehicle and then filtered by way of the filter.

Since the steering feedback torque is ascertained based on the filtered scaled steering rack force signal, the steering feedback torque is thus ascertained taking into consideration the acquired steering rack force signal, the speed signal and the driver torque signal. The appropriate steering feedback torque is thereby provided at any speed and for any steering movement.

Here and in the following text, the term "overlaying" should be understood to mean that the corresponding signals are added or multiplied.

In one exemplary arrangement, the speed-dependent driver torque signal may accordingly correspond to a sum of the speed signal and the driver torque signal or a product of the speed signal and the driver torque signal.

In one exemplary arrangement, the speed-dependent driver torque signal corresponds to a product of the speed signal and the driver torque signal.

According to a further exemplary arrangement of the disclosure, the acquired steering rack force signal is filtered by way of a low-pass filter, thereby giving a low-pass-filtered steering rack force signal, wherein the steering feedback torque is ascertained on the basis of the low-pass-filtered steering rack force signal. By virtue of the low-pass-filtered steering rack force signal, low-frequency components of the steering rack force are accordingly also taken into consideration when ascertaining the steering feedback torque.

Generally speaking, the low-pass filter is configured to filter out, that is to say to remove, a particular frequency range of the steering rack force signal.

The particular frequency range is for example a frequency range that lies above a resonant frequency of the steering system, for example of a steering gear. The low-pass filter accordingly has a passband below the resonant frequency.

The resonant frequency is for example in a range between 10 Hz and 20 Hz.

The influence of the low-frequency and the high-frequency components of the steering rack force on the steering feedback torque may be set separately from one another, for example by weighting the low-frequency components differently from the high-frequency components. It is thereby possible to achieve a naturally acting hysteresis behavior of the steering feedback torque.

In one exemplary arrangement, the low-pass-filtered steering rack force signal is overlaid with the speed signal, wherein the steering feedback torque is ascertained based on the overlaid signal consisting of the low-pass-filtered steering rack force signal and the speed signal. The influence of low-frequency components of the steering rack force is thus scaled in a speed-dependent manner and taken into consideration when ascertaining the steering feedback torque. This gives appropriate feedback that is pleasant for the driver about the surroundings of the motor vehicle, for example about a condition of the road, and about the motor vehicle itself, for example about a response of the motor vehicle to a steering movement, at any speed of the motor vehicle.

One aspect of the disclosure makes provision for a model-based steering rack force signal to be ascertained based on a motor vehicle model, wherein the steering feedback torque is ascertained on the basis of the model-based steering rack force signal. The motor vehicle model may be a mathematical model of the motor vehicle or of parts of the motor vehicle, wherein the mathematical model may be based on a physical equivalent model of the motor vehicle. Based on a measured variable or multiple measured variables that is or are ascertained by way of one or more sensors of the motor vehicle, it is possible to calculate the model-based steering rack force signal based on the mathematical model.

An observer that is able to ascertain unknown variables of the mathematical model based on available measured variables is developed based on the mathematical model. The observer may thus be used to determine unknown variables based on the at least one measured variable, which is able to be measured using sensors that are already installed in the steering system.

It is also conceivable for unknown variables of the mathematical model to be ascertained based on available measured variables by way of a Kalman filter. The Kalman filter works out the unknown variables based on the at least one measured variable, which is able to be measured using sensors that are already installed in the steering system. This saves on costs for the additional measuring sensor system that is otherwise necessary.

A further aspect of the disclosure makes provision for the model-based steering rack force signal to be overlaid with the speed signal, wherein the steering feedback torque is ascertained, based on the overlaid signal including the model-based steering rack force signal and the speed signal. In one exemplary arrangement, the model-based steering rack force signal s multiplied by, that is to say scaled with, the speed signal.

By way of example, the scaled steering rack force signal and the model-based steering rack force signal are weighted differently depending on the speed of the motor vehicle. A weighting factor that is used in the model-based steering rack force signal in particular increases as speed increases, while a weighting factor that is used in the scaled steering rack force signal decreases as speed increases. The corresponding weighting factors may be applied when the scaled steering rack force signal and/or the model-based steering rack force signal are calculated.

A control device for an electromechanically assisted steering system of a motor vehicle is also disclosed. The steering system has a steering arrangement and an electromechanical steering aid having at least one electromechanical actuator. The at least one electromechanical actuator is coupled to the steering arrangement in a torque-transmitting manner. The control device is designed to prompt the steering system to perform a method as described above.

With regard to the advantages and further properties of the control device, reference is made to the above explanations with regard to the method, which apply equally to the control device, and vice versa.

An electromechanically assisted steering system is also disclosed. The electromechanically assisted steering system has a control device as described above, a steering arrangement and an electromechanical steering aid. The electromechanical steering aid has at least one electromechanical actuator that is coupled to the steering arrangement in a torque-transmitting manner.

With regard to the advantages and further properties of the electromechanically assisted steering system, reference is made to the above explanations with regard to the method, which apply equally to the electromechanically assisted steering system, and vice versa.

According to one aspect of the disclosure, the electromechanically assisted steering system is designed as an EPS steering system or as a steer-by-wire steering system.

If the steering system is designed as an EPS steering system, then there is a mechanical operative connection between the steering arrangement and drive wheels of the motor vehicle. Natural feedback about the surroundings and/or the behavior of the motor vehicle is transmitted to the steering arrangement to a certain degree as a result of the mechanical operative connection. Using the method as described above, this natural feedback is modified in a predefined manner in order to generate optimum steering feedback in all driving situations.

If the steering system is designed as a steer-by-wire steering system, then there is no mechanical operative connection between the steering arrangement and wheels of the motor vehicle, which is why the natural feedback as described above is also absent. In this variant, essentially all of the steering feedback is thus generated by the electromechanical actuator by way of the method as described above. Realistic and optimum steering feedback is thereby generated in spite of the lack of mechanical connection.

The object is furthermore achieved according to the disclosure by a computer program containing a program code that is designed to prompt the steering system as described above to perform a method as described above when the computer program is executed on a computing unit of the control device of the steering system.

With regard to the advantages and further properties of the computer program, reference is made to the above explanations with regard to the method, which apply equally to the computer program, and vice versa.

"Program code" is understood here and in the following text to be computer-executable instructions in the form of a program code and/or program code modules in compiled and/or uncompiled form, and may be present in any programming language and/or in machine language.

BRIEF DESCRIPTION OF DRAWINGS

Further advantages and properties of the disclosure will become apparent from the following description and the accompanying drawings, to which reference is made. In the figures.

DETAILED DESCRIPTION

Figure 1A:
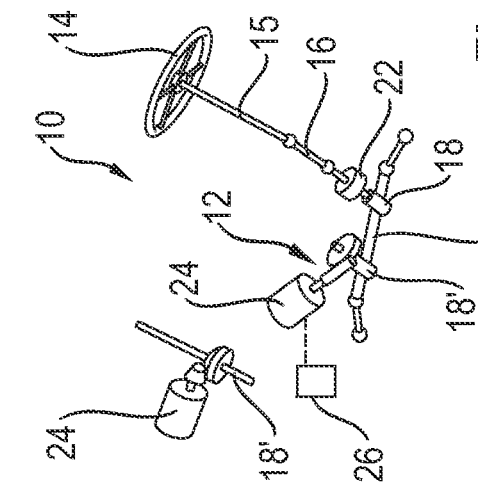
FIG. 1(a) shows a schematic oblique view of an electromechanically assisted steering system with an electric motor connected to a gear according to the disclosure.

FIG. 1(a) schematically shows a steering system 10 for a motor vehicle, wherein the steering system 10 has a gear 12 and is configured as an electromechanically assisted steering system with steering column assistance (or "column drive EPS").

The steering system 10 has a steering wheel 14 that is connected to a first pinion 18 via an upper part of a steering column 15 and via a steering intermediate shaft 16. The first pinion 18 meshes with a steering rack 20, such that a torque is applied to the latter.

A torque and/or steering angle sensor 22 is arranged on the steering column 15 and is designed to measure steering torques and/or a steering angle. This is thus in particular a steering torque and steering angle sensor, also called a "torque and angle sensor (TAS)", and is able to provide a steering angle in addition to the steering torque.

Provision is also made for an electric motor 24 that is connected to the gear 12 in a torque-transmitting manner.

As indicated in FIG. 1(a), the gear 12 may be designed in various ways, for example as a worm gear, as a spur gear or as a bevel gear.

In any case, at least a torque that is provided by the electric motor 24 is transmitted by the gear 12 to the steering intermediate shaft 16 in order to perform a steering movement.

The electric motor 24 is connected to a control device 26 of the steering system 10 in a signal-transmitting manner, this being indicated only schematically in each of FIGS. 1(a) to (f).

The control device 26 is designed to ascertain at least one torque to be applied based on measured data from the steering system 10 and to transmit corresponding control commands to the electric motor 24, such that the electric motor 24 provides at least the torque to be applied.

The controller 26 is furthermore designed to control, for example to steer, the motor vehicle at least partly automatically, and in one exemplary arrangement, fully automatically. In this case, the electric motor 24 thus provides not just an assistive torque, but rather the full torque required to control or steer the motor vehicle.

Figure 1B:
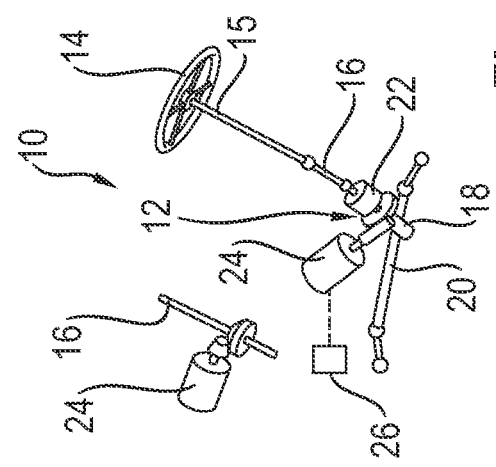
FIG. 1(b) shows a schematic oblique view of an electromechanically assisted steering system with an electric motor connected to a first pinion according to the disclosure.

The steering system 10 shown in FIG. 1(b) differs from that shown in FIG. 1(a) in that the electric motor 24 is connected not to the steering intermediate shaft 16, but rather to the first pinion 18 in a torque-transmitting manner via the gear 12. The steering system 10 thus has a simple pinion drive, which is also called a "single pinion EPS".

Figure 1C:
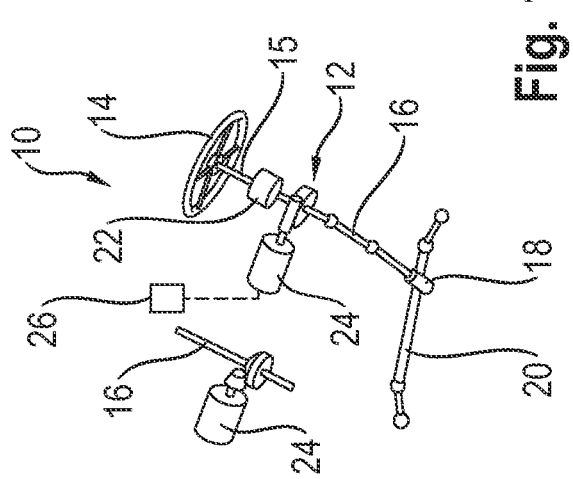
FIG. 1(c) shows a schematic oblique view of an electromechanically assisted steering system with an electric motor connected to a second pinion according to the disclosure.

The steering system 10 shown in FIG. 1(c) has a second pinion 18' that is in meshing engagement with the steering rack 20. The electric motor 24 is connected to the second pinion 18' in a torque-transmitting manner via the gear 12. The steering system 10 is thus in this case a dual-pinion steering system, also called a "dual pinion EPS".

Figure 1D:
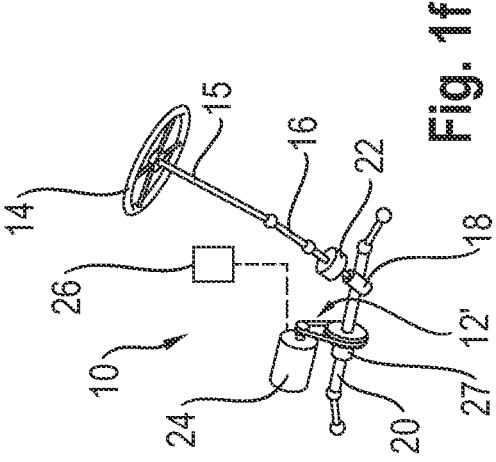
FIG. 1(d) shows a schematic oblique view of an electromechanically assisted steering system with an electric motor connected to a steering rack according to the disclosure.
Figure 1E:
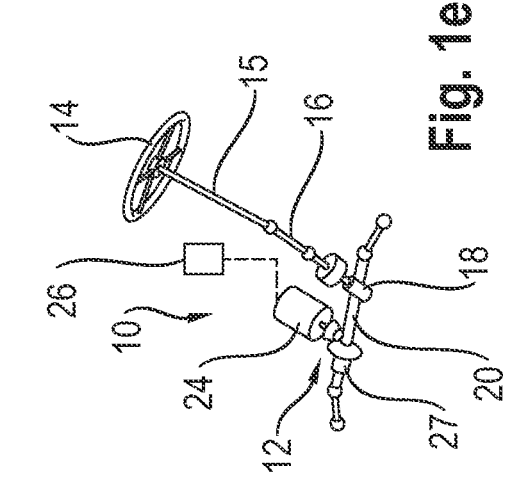
FIG. 1(e) shows a schematic oblique view of an electromechanically assisted steering system with an electric motor providing torque to a steering rack via a gear and a recirculating ball nut.
Figure 1F:
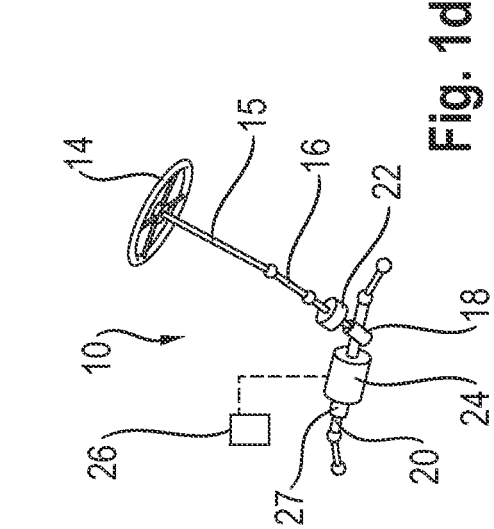
FIG. 1(f) shows a schematic oblique view of an electromechanically assisted steering system with an electric motor providing torque to a recirculating ball nut via a belt of a belt drive and to a steering rack.

Further possible exemplary arrangements of the electromechanically assisted steering system 10 are shown in FIGS. 1(d) to 1(f).

More precisely, FIG. 1(d) shows a steering system 10 having a concentric steering rack drive using a recirculating ball nut 27. The electric motor 24 is in this case arranged directly on the steering rack 20 and applies the assistive torque to the steering rack 20 via the recirculating ball nut 27.

FIG. 1(e) shows a drive in which the gear 12 is designed as a bevel gear, and in which a recirculating ball nut 27 is installed on the steering rack 20. The electric motor 24 applies the assistive torque to the steering rack 20 via the gear 12 and the recirculating ball nut 27.

FIG. 1(f) shows a belt drive 12' having a recirculating ball nut 27 installed on the steering rack 20. An assistive torque applied by the electric motor 24 is transmitted to the recirculating ball nut 27 via a belt of the belt drive 12', and to the steering rack 20 via said recirculating ball nut.

Figure 2:
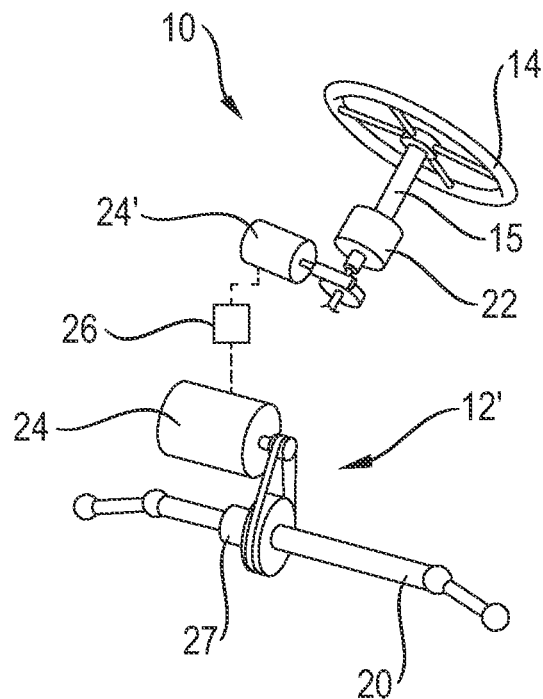
FIG. 2 shows a schematic oblique view of a steer-by-wire variant of the electromechanically assisted steering system according to the disclosure.

FIG. 2 shows a further exemplary arrangement of the steering system 10. The steering system 10 is designed here as a steer-by-wire steering system, that is to say there is no mechanical operative connection between the steering wheel 14 and the steering rack 20. The steering angle sensor 22 instead ascertains a steering angle and transmits it to the control device 26. The control device 26 drives the electric motor 24, which is connected to the steering rack 20 via a belt drive in the exemplary arrangement shown in FIG. 2, so as to generate a torque required to control or steer the motor vehicle. The steering system 10 in this case furthermore has a steering wheel actuator 24' that is able to apply a torque to the steering wheel 14, for example in order to generate roadway feedback.

However, the electric motor 24 does not have to be connected to the steering rack 20 via a belt drive. The electric motor 24 may instead be connected to the steering rack via any suitable gear, for example via a worm gear.

The electromechanically assisted steering system 10 is designed to perform a method for operating a steering system 10, the method being described below with reference to FIG. 3.

More precisely, the control device 26 comprises a computer program containing a program code that is designed to prompt the steering system 10 to perform the method as described below when the computer program is executed on a computing unit or a processor of the control device 26 of the steering system 10.

"Program code" is understood here and in the following text to be computer-executable instructions in the form of program code and/or program code modules in compiled and/or uncompiled form, and may be present in any programming language and/or in machine language.

It is pointed out that the method for operating a steering system may be performed, with appropriate adjustments, in steering systems 10 according to FIGS. 1(*a*) to (*f*) and according to FIG. 2.

Figure 3:
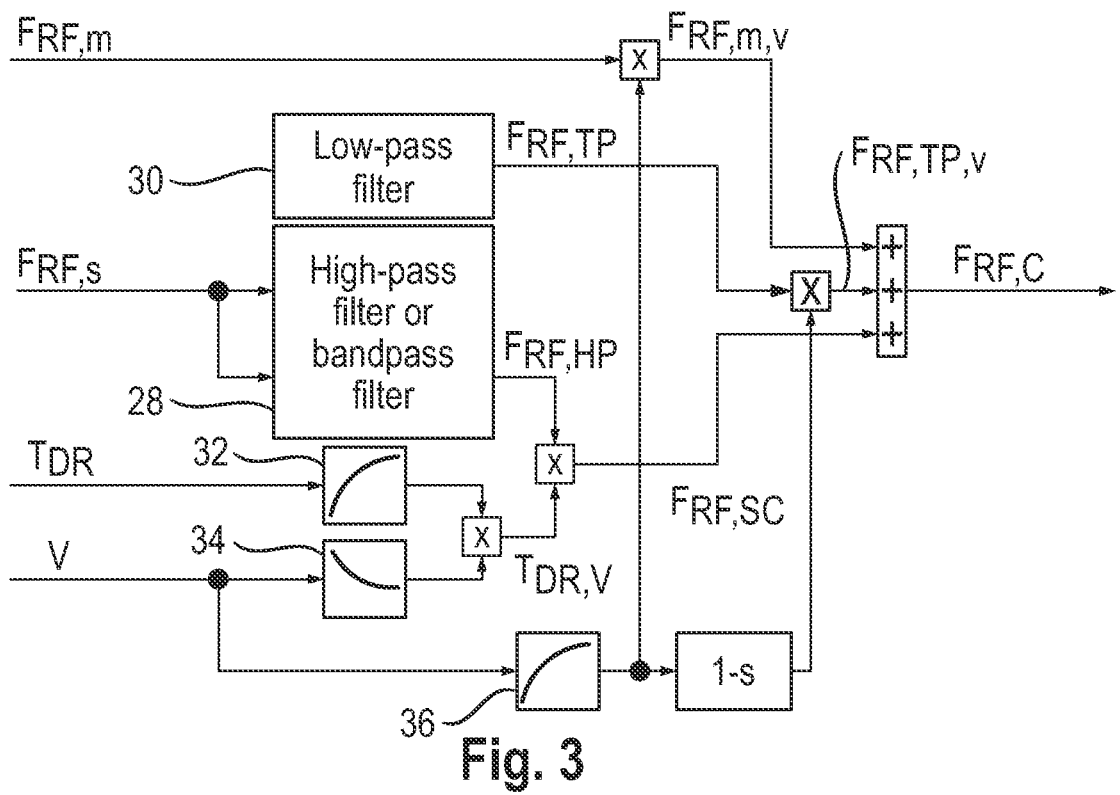
FIG. 3 schematically shows a block diagram for explaining the sequence of a method according to the disclosure.

FIG. 3 shows a block diagram for illustrating the method.

A steering rack force signal $F_{RF,s}$, a driver torque signal $T_{DR}$ and a speed signal v are acquired. A model-based steering rack force signal $F_{RF,m}$ is also ascertained.

The steering rack force signal $F_{RF,s}$ and the model-based steering rack force signal $F_{RF,m}$ here each comprise information about a steering rack force acting on the steering rack 20.

The driver torque signal comprises information about a driver torque exerted on the steering wheel 14 by the driver, that is to say for example about a torque that the driver applies to the steering wheel 14.

The speed signal v comprises information about the speed of the motor vehicle. It may for example be read from a CAN signal of a corresponding bus system of the motor vehicle.

Here and in the following text, "acquiring" should be understood to mean that the corresponding signal is measured directly and/or determined from other measured variables, that is to say is calculated.

The steering rack force signal $F_{RF,s}$ may thus be measured directly or determined from other measured variables.

By way of example, a motor position of the electric motor 24 or 24', an assistive torque of the electric motor 24, a steering column torque, a steering angle and/or a steering rack position may be ascertained by way of suitable sensors of the steering system 10, and the steering rack force signal $F_{RF,s}$ is ascertained from one or more of these variables.

An observer is in particular developed based on a mathematical model of a lower part of the steering system 10, wherein the lower part of the steering system 10 comprises the steering rack 20.

The mathematical model may be based here on a physical equivalent model, by way of which the lower part of the steering system 10 is modeled.

The observer may be used to determine unknown variables of the mathematical model based on available measured variables, which are able to be measured using sensors that are already installed in the steering system 10.

The observer may thus be used to ascertain the steering rack force signal $F_{RF,s}$ based on available measured variables even when not all variables of the mathematical model that are required for this are able to be measured.

In the same way, the driver torque signal $F_{DR}$ may be measured directly or determined based on other measured variables.

By way of example, the driver torque signal $F_{DR}$ may be measured directly by way of the torque and/or steering angle sensor 22.

As an alternative or in addition, other variables, for example a motor position of the electric motor 24 or 24', a steering column torque, a steering angle and/or a steering rack position, may be ascertained by way of suitable sensors of the steering system 10, and the driver torque signal $T_{DR}$ is ascertained from one or more of these variables.

The model-based steering rack force signal $F_{RF,m}$ is ascertained based on a motor vehicle model. The motor vehicle model may be a mathematical model of the motor vehicle or of parts of the motor vehicle, wherein the mathematical model may be based on a physical equivalent model of the motor vehicle.

Based on a measured variable or multiple measured variables that is or are ascertained by way of one or more sensors of the motor vehicle, it is possible to calculate the model-based steering rack force signal $F_{RF,m}$ based on the mathematical model of the motor vehicle.

A further observer that is able to ascertain unknown variables of the mathematical model based on available measured variables is optionally developed based on the mathematical model. The further observer may thus be used to determine unknown variables based on measured variables, which are able to be measured using sensors that are already installed in the steering system 10.

The further observer may thus be used to ascertain the model-based steering rack force signal $F_{RF,m}$ based on available measured variables even when not all variables of the mathematical model of the motor vehicle that are required for this are able to be measured.

The acquired steering rack force signal $F_{RF,s}$ is filtered by way of a filter 28, designed as a high-pass filter in the exemplary embodiment shown, thereby giving a filtered steering rack force signal $F_{RF,HP}$. As an alternative to the high-pass filter, the filter 28 may also be a bandpass filter.

Generally speaking, the filter 28, that is to say the low-pass filter or the bandpass filter, is configured to filter out, that is to say to remove, a particular frequency range of the steering rack force signal $F_{RF,s}$.

In one exemplary arrangement, the particular frequency range is for example a frequency range that comprises a resonant frequency of the steering system 10, in particular of the steering gear 12 or 12'.

In other words, the filter 28, that is to say the high-pass filter or the bandpass filter, is thus used to filter out components of the steering rack force signal $F_{RF,s}$ that lie below the resonant frequency.

The resonant frequency is for example in a range between 10 Hz and 20 Hz.

The filter 28, that is to say the high-pass filter or the bandpass filter, accordingly has for example a passband above the resonant frequency.

The acquired steering rack force signal $F_{RF,s}$ is filtered in parallel therewith by way of a low-pass filter 30, thereby giving a low-pass-filtered steering rack force signal $F_{RF,TP}$.

Generally speaking, the low-pass filter 30 is configured to filter out, that is to say to remove, a particular frequency range of the steering rack force signal $F_{RF,s}$.

The particular frequency range is for example a frequency range that comprises a resonant frequency of the steering system 10, in particular of the steering gear 12 or 12'.

In other words, the low-pass filter 30 is thus used to filter out components of the steering rack force signal $F_{RF,s}$ that lie above the resonant frequency.

The resonant frequency is for example in a range between 10 Hz and 20 Hz.

The low-pass filter 30 accordingly has a passband below the resonant frequency.

The acquired driver torque $T_{DR}$ is overlaid, more precisely scaled, with the speed signal, thereby giving a speed-dependent driver torque signal $T_{DR,v}$.

The acquired driver torque signal $T_{DR}$ may be multiplied here by a first weighting function 32. By way of example, the value of the first weighting function 32 increases as driver torque increases.

The speed signal v may be multiplied by a second weighting function 34. By way of example, the value of the second weighting function 34 decreases as speed increases.

As illustrated in FIG. 3, the resultant speed-dependent driver torque signal $T_{DR,v}$ contains information about the driver torque $T_{DR}$ exerted on the steering wheel 14 by the driver and information about the speed of the motor vehicle.

The filtered steering rack force signal $F_{RF,HP}$ is scaled with the speed-dependent driver torque signal $T_{DR,v}$, thereby giving a filtered scaled steering rack force signal $F_{RF,sc}$.

The scaled steering rack force signal therefore contains information about a high-frequency component of the steering rack force, the driver torque, and the speed of the motor vehicle.

It is pointed out that the acquired steering rack force signal $F_{RF,s}$ may also first be scaled with speed-dependent driver torque signal $T_{DR,v}$, wherein the resultant scaled steering rack force signal is then filtered by way of the filter 28 in order to obtain the filtered scaled steering rack force signal $F_{RF,sc}$. The order of the scaling and filtering may thus also be reversed.

The model-based steering rack force signal $F_{RF,m}$ is scaled with, that is to say multiplied by, the speed signal v, thereby giving a model-based speed-dependent steering rack force signal $F_{RF,m,v}$.

The speed signal v may be multiplied beforehand here by a third weighting function 36, for example wherein the third weighting function 36 increases as speed increases, as indicated by way of example in FIG. 3.

The low-pass-filtered steering rack force signal $F_{RF,TP}$ is furthermore overlaid with the speed signal v, thereby giving a low-pass-filtered speed-dependent steering rack force signal $F_{RF,TP,v}$. More precisely, the low-pass-filtered steering rack force signal $F_{RF,TP}$ is scaled with, that is to say multiplied by, the speed signal v.

The speed signal v may have been weighted beforehand here, for example with the third weighting function 36 and the fourth weighting function ("1-s" in FIG. 3).

The filtered scaled steering rack force signal $F_{RF,sc}$, the model-based speed-dependent steering rack force signal $F_{RF,m,v}$ and the low-pass-filtered speed-dependent steering rack force signal $F_{RF,TP,v}$ are added, thereby giving a combined steering rack force signal $F_{RF,c}$.

Based on the combined steering rack force signal $F_{RF,c}$, a steering feedback torque for the electric motor 24 or 24' is ascertained by the control device 26 in subsequent steering sensation functions (for example basic steering torque, active reset, damping, etc.).

In EPS steering systems, as illustrated in FIGS. 1(a) to (f), there is a mechanical operative connection between the drive wheels of the motor vehicle and the steering wheel 14. In this case, however, the steering sensation may be changed via the electric motor 24 by changing the torque, that is to say the steering feedback torque, able to be perceived on the steering arrangement by the driver.

In steer-by-wire steering systems illustrated in FIG. 2, there is no mechanical operative connection between the wheels of the motor vehicle and the steering wheel 14. The steering wheel 14 is in this case assigned its own electric motor 24' that generates the steering feedback torque. In this case, essentially all of the torque able to be perceived on the steering means by the driver is thus generated by the electric motor 24'.

Regardless of the type of steering system, the method as described above makes it possible to give appropriate steering feedback that is pleasant for the driver in any driving situation, for example for any vehicle speed.

The steering feedback for example gives the driver information about a response of the motor vehicle to a steering movement. As an alternative or in addition, the steering feedback dives the driver information about the surroundings of the motor vehicle, for example about the condition of the road on which the motor vehicle is traveling. The steering feedback may accordingly be used, if desirable, also to transmit useful information and/or problem information about the roadway condition to the driver.

The invention claimed is:

1. A method for operating an electromechanically assisted steering system of a motor vehicle, wherein the steering system has a steering arrangement and at least one electromechanical actuator, wherein the at least one electromechanical actuator is coupled to the steering apparatus in a torque-transmitting manner, comprising the following steps:
   acquiring a steering rack force signal that comprises information about a steering rack force acting on a steering rack of the steering system;
   acquiring a driver torque signal that comprises information about a driver torque exerted on the steering arrangement by the driver;
   ascertaining a filtered scaled steering rack force signal, wherein the acquired steering rack force signal is filtered by way of a filter designed as a high-pass filter or bandpass filter and the resultant filtered steering rack force signal is scaled on the basis of the acquired driver torque signal in order to ascertain the filtered scaled steering rack force signal; and
   ascertaining a steering feedback torque for the at least one electromechanical actuator based on the filtered scaled steering rack force signal.

2. The method as claimed in claim 1, wherein a speed signal is acquired, this comprising information about a speed of the motor vehicle.

3. The method as claimed in claim 2, wherein the speed signal is overlaid with the driver torque signal in order to ascertain a speed-dependent driver torque signal, wherein the acquired steering rack force signal is scaled with the speed-dependent driver torque signal in order to obtain the filtered scaled steering rack force signal.

4. The method as claimed in claim 2, wherein the model-based steering rack force signal is overlaid with the speed signal.

5. The method as claimed in claim 2, wherein the speed signal is overlaid with the driver torque signal in order to ascertain a speed-dependent driver torque signal, wherein the filtered steering rack force signal is scaled with the speed-dependent driver torque signal in order to obtain the filtered scaled steering rack force signal.

6. The method as claimed in claim 2, wherein the low-pass-filtered steering rack force signal is overlaid with the speed signal, and wherein the steering feedback torque is ascertained based on the overlaid signal including the low-pass-filtered steering rack force signal and the speed signal.

7. The method as claimed in claim 1, wherein the acquired steering rack force signal is filtered by way of a low-pass filter, thereby giving a low-pass-filtered steering rack force signal, and wherein the steering feedback torque is ascertained on the basis of the low-pass-filtered steering rack force signal.

8. The method as claimed in claim 7, wherein the low-pass-filtered steering rack force signal is overlaid with the speed signal, and wherein the steering feedback torque is ascertained based on the overlaid signal including the low-pass-filtered steering rack force signal and the speed signal.

9. The method as claimed in claim 1, wherein a model-based steering rack force signal is ascertained based on a motor vehicle model.

10. The method as claimed in claim 9, wherein the model-based steering rack force signal is overlaid with the speed signal, and wherein the steering feedback torque is ascertained based on the overlaid signal including the model-based steering rack force signal and the speed signal.

11. A control device for an electromechanically assisted steering system of a motor vehicle, wherein the steering system has a steering arrangement and an electromechanical steering aid having at least one electromechanical actuator, wherein the at least one electromechanical actuator is coupled to the steering arrangement in a torque-transmitting manner, and wherein the control device is designed to prompt the steering system to perform a method as claimed in claim 1.

12. An electromechanically assisted steering system, having a control device as claimed in claim 11, a steering arrangement and an electromechanical steering aid, wherein the electromechanical steering aid has at least one electromechanical actuator that is coupled to the steering arrangement in a torque-transmitting manner.

13. The electromechanically assisted s system as claimed in claim 12, wherein the electromechanically assisted steering system is designed as an EPS steering system or as a steer-by-wire steering system.

14. The method as claimed in claim 1, wherein the steering feedback torque is additionally ascertained on the basis of the speed signal.

15. The method as claimed in claim 14, wherein the steering feedback torque is ascertained on the basis of the model-based steering rack force signal.

16. A method for operating an electromechanically assisted steering system of a motor vehicle, wherein the steering system has a steering arrangement and at least one electromechanical actuator, wherein the at least one electromechanical actuator is coupled to the steering apparatus-in a torque-transmitting manner, comprising the following steps:
    acquiring a steering rack force signal that comprises information about a steering rack force acting on a steering rack of the steering system;
    acquiring a driver torque signal that comprises information about a driver torque exerted on the steering arrangement by the driver;
    ascertaining a filtered scaled steering rack force signal, wherein the acquired steering rack force signal is scaled, inter alia, on the basis of the acquired driver torque signal and the resultant scaled steering rack force signal is filtered by way of a filter (28) designed as a high-pass filter or bandpass filter in order to ascertain the filtered scaled steering rack force signal; and
    ascertaining a steering feedback torque for the at least one electromechanical actuator based on the filtered scaled steering rack force signal.

* * * * *